Aug. 26, 1947. F. H. BEALL 2,426,428
ROTARY CYLINDER ENGINE, OPPOSED SLIDING ABUTMENTS
Filed Dec. 6, 1943 5 Sheets-Sheet 1

INVENTOR.
FRANK H. BEALL,
BY
ATTORNEYS.

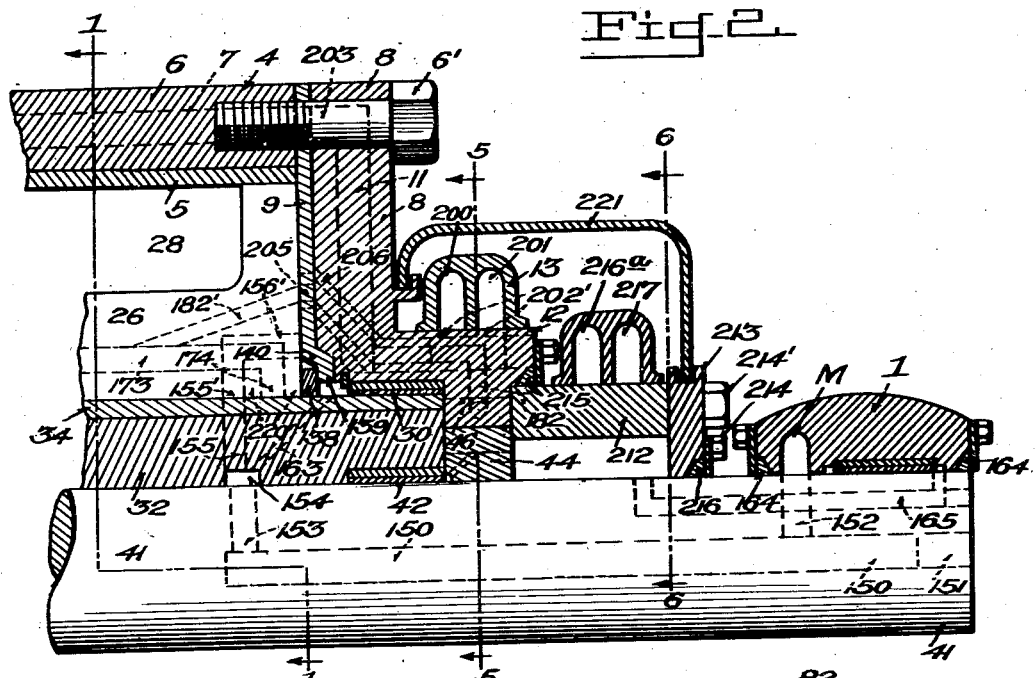
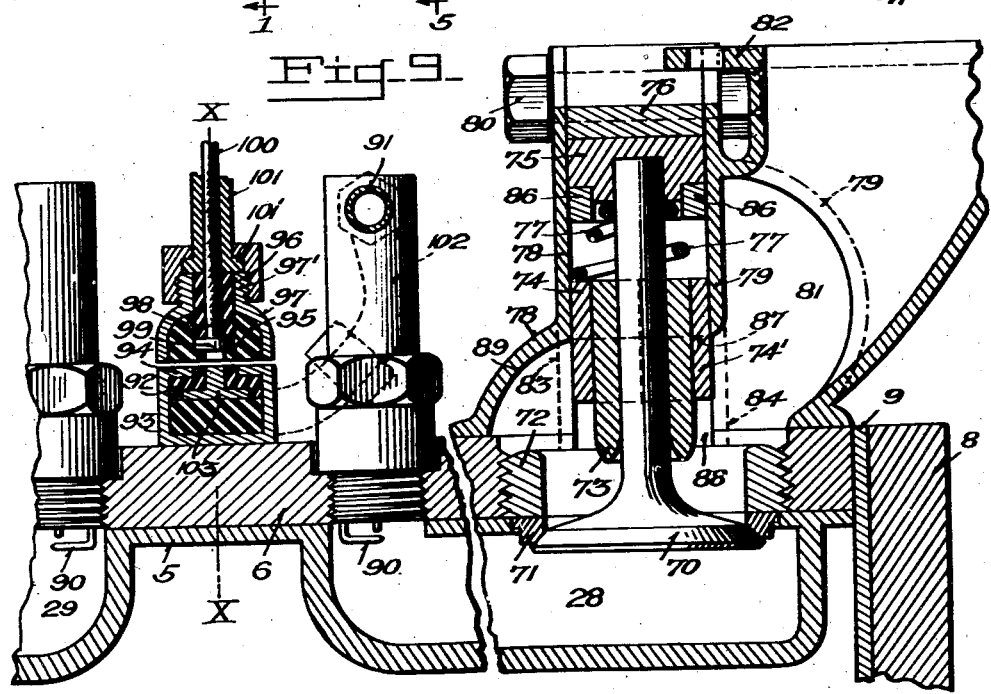

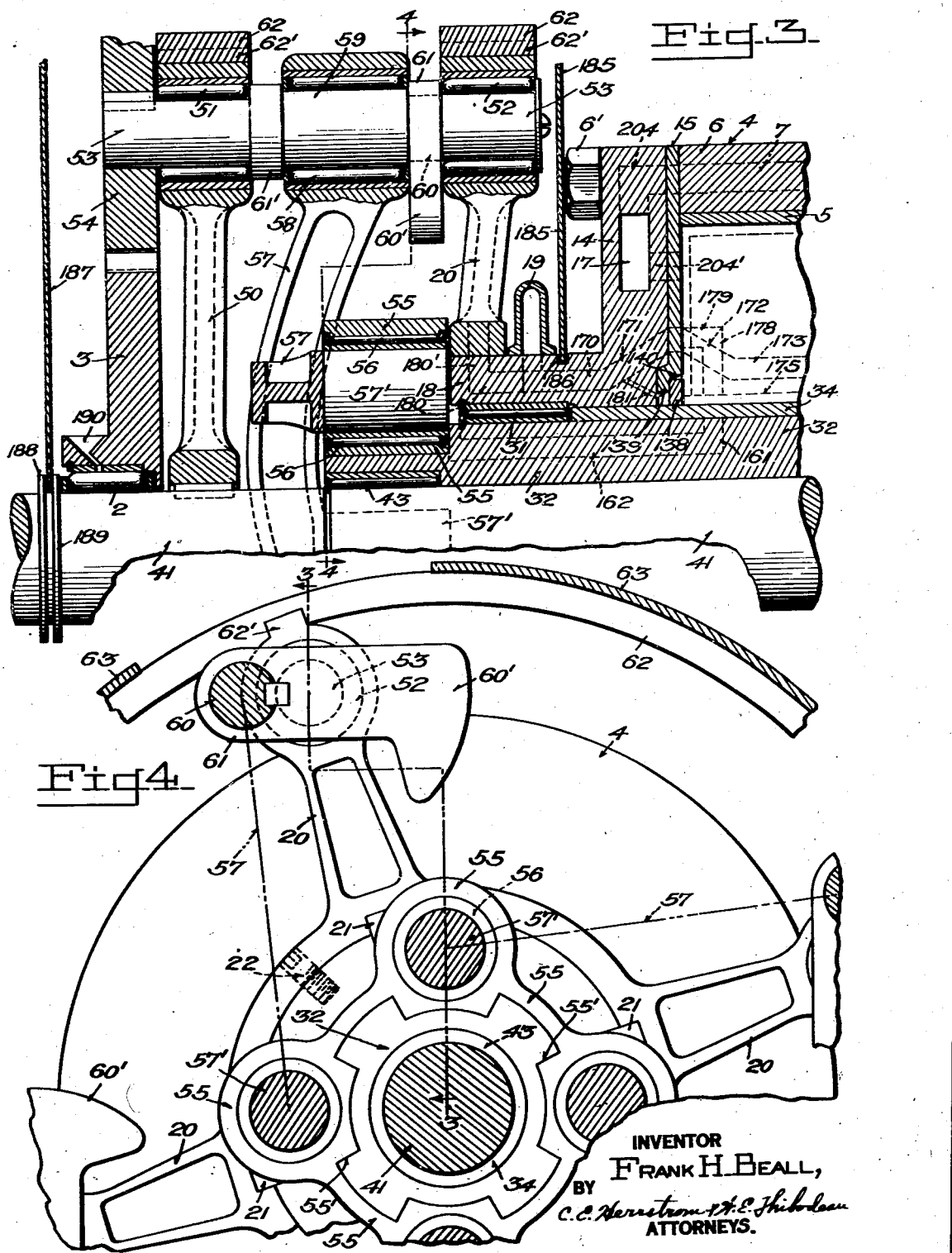

Aug. 26, 1947.   F. H. BEALL   2,426,428
ROTARY CYLINDER ENGINE, OPPOSED SLIDING ABUTMENTS
Filed Dec. 6, 1943   5 Sheets-Sheet 4
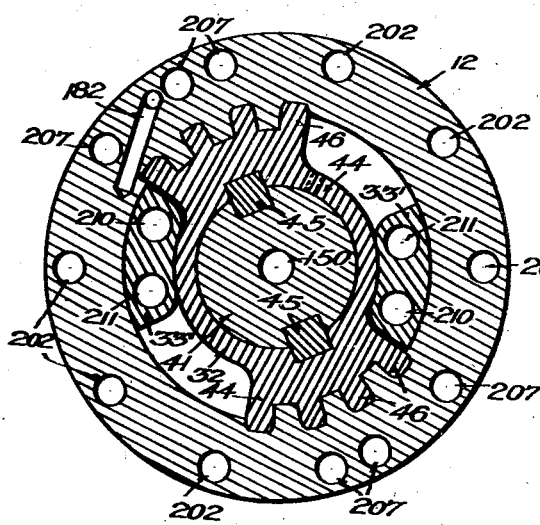
Fig.5.
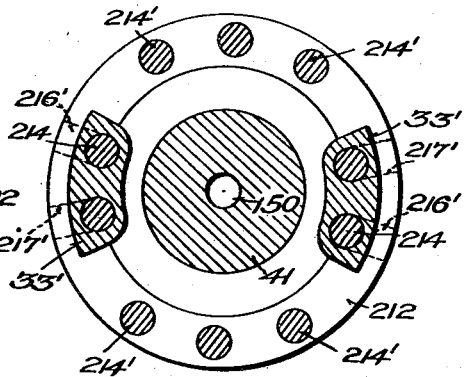
Fig.6.
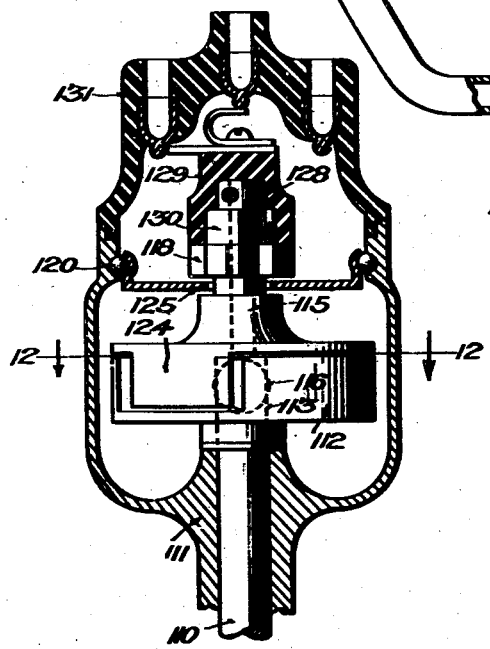
Fig.11.
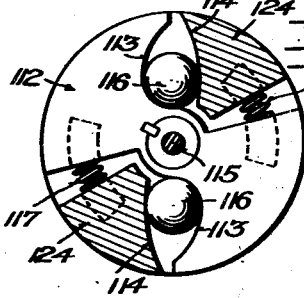
Fig.10.
Fig.12.
INVENTOR
FRANK H. BEALL,
BY
ATTORNEYS.

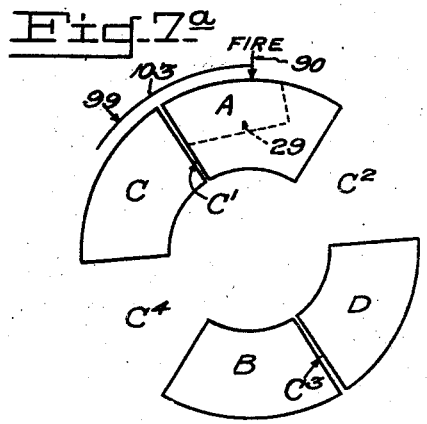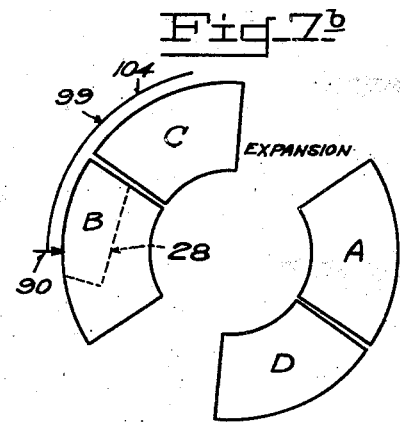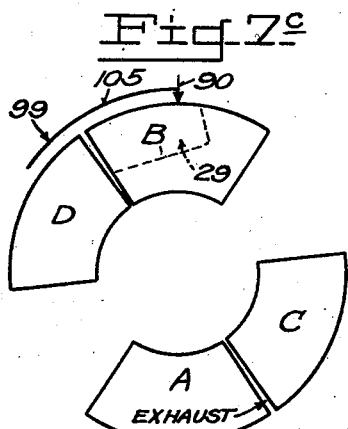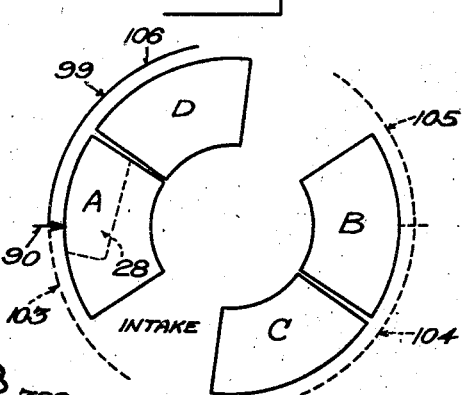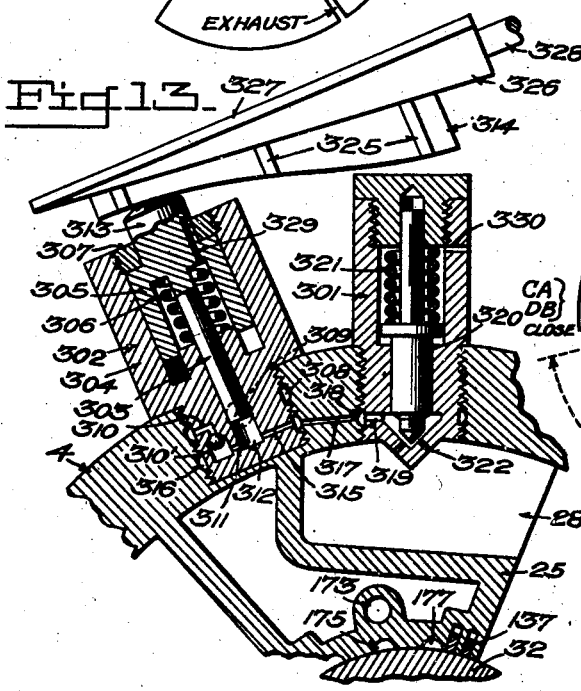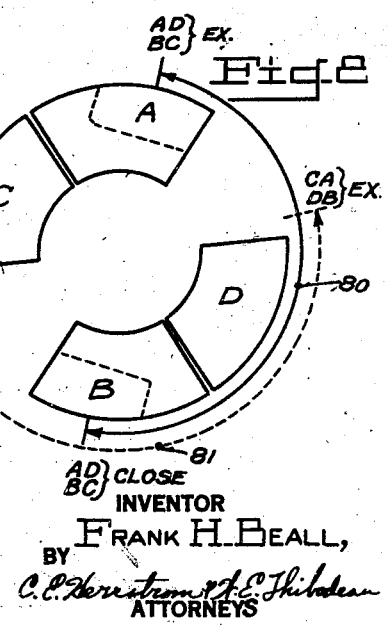

Patented Aug. 26, 1947

2,426,428

UNITED STATES PATENT OFFICE 2,426,428

ROTARY CYLINDER ENGINE, OPPOSED SLIDING ABUTMENTS

Frank H. Beall, Detroit, Mich.

Application December 6, 1943, Serial No. 513,142

17 Claims. (Cl. 123—43)

This invention relates to an internal combustion engine comprising a cylinder containing two sets of radial abutments, each set comprising two or more abutments operating as a unit and whereor in one set is arranged to oscillate with reference to the other set so that at one moment one set is moving and acting as a piston imparting rotative energy to the shaft and next is acting as an abutment for the other set which is acting as a piston.

Engines of this general type can be divided into three classes:

(1) Where the cylinder is stationary and the two sets of radial abutments or pistons revolve, alternately approaching and receding from one another.

(2) Where the cylinder revolves and is integral with one set of the abutments and encloses a shaft containing the second set of abutments or pistons which rotate and oscillate relatively to the abutments integral with the revolving cylinder, such as in U. S. Patents to Allen, 1,234,599 and Woodward, 1,353,205.

(3) This type is structurally similar to the second type, but has the cylinder and the integral abutments held stationary, and the second set of abutments oscillate between the stationary abutments.

A number of designs of each modification are shown in the prior art, but none is suitable for the exacting requirements of high speed operation comparable with that of the present reciprocating internal-combustion engine. For instance engines of the type of class 1, the one most prevalent in the prior art because of the relative simplicity of operative design, would develop impossible peripheral speeds between the outer surface of the oscillating abutments and the stationary cylinder if a reasonably large engine is operated at high speed.

In the second class where the cylinder and abutments integral therewith revolve, this relative speed problem is reduced, but at the expense of greatly complicating the problem of obtaining an operative design that will function to bring out the inherent theoretical advantages of this type of engine over the present reciprocating engine. As a result there have been relatively few attempts to perfect this type although its possibilities have been recognized since 1911.

The second class has the advantage over the third class inasmuch as the rotating cylinder acts as a flywheel, thereby greatly reducing the weight necessary for the same smoothness of operation. Therefore the showing herein will be confined to the revolving cylinder type, although it will be readily recognized that many of the vital improvements incorporated therein are equally applicable to the third class where the cylinder is held stationary and the pistons oscillate therein.

While superficially a high and a low speed motor may seem to be the same thing, actually their operation is entirely different, and the factors governing the design of a high speed motor are entirely distinct from those governing the design of a low speed motor. For instance, in a low speed motor the explosion pressure is a predominant factor, but in the high speed engines the inertia of the reciprocating parts and the centrifugal forces of unbalanced masses become controlling factors. With increasing bearing pressures and higher speeds between the wearing parts comes the problem of providing adequate lubrication. As the engine shrinks in size for the horse power output, the proper cooling of the lubricated surfaces becomes a problem not only of sufficiency of cooling area, but the proper application thereof, so as not to interfere with the requirement of high speed flame travel in the combustion mixture or to allow local overheating and resulting rough operation with its decreased efficiency.

Further comes the vital problem of supplying adequate fuel mixture to maintain a high volumetric efficiency at high speed, which eliminates the long and tortuous inlet and exhaust passages shown in the prior art. This is further complicated by the requirement of a high compression ratio which seriously interferes with the obtaining of adequate intake and exhaust port areas.

While this engine operates on the four cycle principle, there is an explosion in each compartment every revolution, and the duration of each cycle is only a quarter of a revolution instead of a half revolution as in the reciprocating engine, so that one of the very advantages of this engine tremendously complicates its proper design as compared with the present high speed reciprocating engine which has only been perfected through long years of development.

The object of this invention is to provide an engine of this type capable of high speed efficient operation.

A further object is to provide an engine of greater horsepower per unit of weight than can possibly be obtained with the present reciprocating engine.

A further object is to provide such an engine with better balanced operation than can be obtained with present engines.

Although, in general, dimensions are not considered in patent applications, dimensions become a vital and controlling factor in obtaining the above objects. Without specifying how all the many requirements of such an engine are adequately provided for in the limited space available there has been no disclosure of an operative "high speed" engine of this type within the meaning of the term as employed in present day engine design. Therefore a complete scale design of an engine having a six inch by ten inch cylinder is shown in the drawings and proportionally reduced.

In the drawings:

Figure 2 is a section on the line 2—2 of Figure 1, showing the forward end of the engine, as used in an automobile;

Figure 3 is a section on the line 3—3 of Figure 4 showing the rearward end of the engine;

Figure 4 is a section on the line 4—4 of Figure 3;

Figure 5 is a section on the line 5—5 of Figure 2, without the water manifold;

Figure 6 is a section on the line 6—6 of Figure 2;

Figures 7a, 7b, 7c and 7d are diagrams showing the location of the abutments at the four firing positions;

Figure 8 is a diagram showing the intervals of valve opening;

Figure 9 is a longitudinal radial section of the engine;

Figure 10 is a detail section of the spark control;

Figure 11 is a section on the line 11—11 of Figure 10;

Figure 12 is a section on the line 12—12 of Figure 11, and

Figure 13 is the detail section showing a pump and injector applied to the cylinder for Diesel operation.

Figure 1:
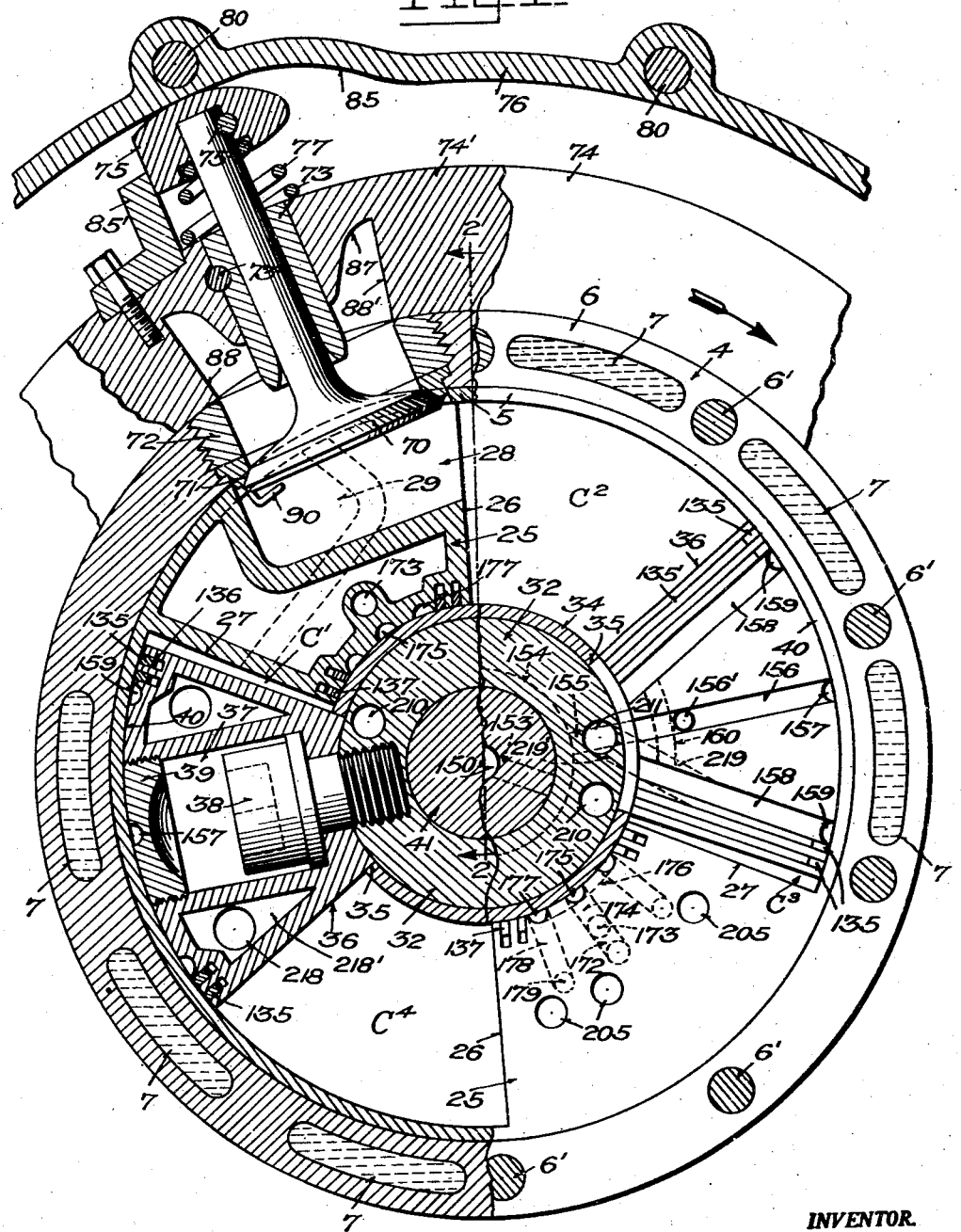
Figure 1 is a section of the cylinder on the line 1—1 of Figure 2.

With the exception of the exhaust and intake manifolds, the water and oil feeds and the crankcase housing, the entire engine revolves in main bearings 1 and 2. Bearing 2 has fixed thereto a non-rotatable gear 3 to obtain proper operation of the oscillations of the piston abutments as will hereinafter be explained.

The cylinder is shown at 4, Figs. 1-4, and as previously stated is designed to have an inside diameter of six inches, with all other engine features being drawn to scale for the purpose of showing how all the features fit into the compact assembly necessary for a "high-speed" lightweight engine. By "high speed" is meant an engine that would normally operate in the same speed range as present-day engines, which are readily operable up to 3,000 or 4,000 revolutions per minute or even higher before the maximum power output curve has seriously fallen off, largely due to decreasing volumetric efficiency with increasing engine friction loss. At say 3500 R. P. M., the rapidity of the firing in this engine per cylinder would be equal to the ordinary engine operating at 7000 R. P. M. for the standard four cycle, a rate that has been attained only in a few small racing engines of special construction.

For the purposes of light weight the cylinder 4 is shown as a composite cylinder having a steel or other wear resistant metal liner 5 and a reinforcing outer cylinder 6 of aluminum or other light metal containing passages 7 for the longitudinal flow of cooling water.

Bolted to the forward end of the cylinder 6 by bolts 6' is a flange 8 (Figure 2) which is shown as having a steel inner facing 9 while the body of the flange consists of aluminum and is formed with cooling water passageways 11 cooperating with passages 7 in the aluminum cylinder 6. Integral with flange 8 is a hub 12 which is surrounded by an inlet and outlet non-rotating cooling water manifold 13 for the purpose of supplying cooling water to the rotating cylinder and the abutments fastened to it, as will be described later.

Bolted on the rearward end of cylinder 6 by bolts 6' is a flange 14 (Figure 3) which is shown as having a steel inner facing 15 while the body of the flange consists of aluminum and is formed with cooling water passages 17. Integral with this flange 14 is a hub 18 which is surrounded by a non-rotating oil inlet manifold 19. Also mounted on the end of said hub 18 is a spider 20, preferably of aluminum, and keyed thereto by keys 21, and prevented from having endwise motion by set screw 22 (Figure 4). The function of this spider will be described later.

Fixed to the steel cylinder liner 5, such as by welding, and extending throughout the length of the cylinder are the segment-like abutments 25 having their outer faces 26 and 27, Figure 1, extending radially toward the center. These abutments are cast hollow to hold the cooling water and for lightness. Longitudinally offset on opposite sides of each of the two abutments are two combustion chambers 28 and 29, shown in Figures 1, 2 and 9, formed as recesses in the abutment walls 26 and 27.

Mounted in the precision bearing 30 in hub 12 and needle bearing 31 in hub 18 is a hollow shaft or rotor 32. For lightness this shaft is shown as being composed of an inner aluminum or other light metal shaft having an outer facing or liner 34 of steel or other wear resistant metal. The inner faces of abutments 25 are ground to fit the circular curvature of shaft 32 with a clearance of about 0.01 inch, thus dividing the space between shaft 32 and the inner face of cylinder 4 into two equal volumes.

Within the cylinder and for exactly the length thereof between flange facings 9 and 15 the steel facing 34 of the shaft 32 is slotted as at 35 (Figure 1) to receive the wedge-shaped aluminum or other light metal abutments 36, hereinafter termed pistons, as distinguished from the abutments fixed to the cylinder. These pistons are hollow to receive the cooling water, but each contains equally spaced, cored out wells 37 forming cavities to receive bolts 38 for firmly bolting the pistons 36 to shaft 32. The outer opening of the cavities are closed by cover plates 39. The outer circular faces 40 of the pistons are ground to fit the inner lining 5 of the cylinder 4 with a clearance of about 0.01 inch.

By means hereinafter described, the pistons are caused to oscillate so as to alternately approach walls 27 of the abutments 25, as shown, and then approach walls 26, leaving a small clearance in each extreme position, shown in Figure 1 as C—1, C—3 for walls 27. This alternate expanding and contracting of the four volumes between the pistons 36 and the abutments 25 forms the working compartments for the four cycles, i. e., intake, compression, expansion and exhaust, which are simultaneously taking place in the several volumes, as the cylinder and pistons are rotating and the pistons are oscillating with reference to the cylinder abutments.

For the purpose of producing a rigid but compact oscillating means, shown in Figures 3 and 4, the cylinder and pistons are mounted on a steel shaft 41, extending through the hollow shaft 32 and supported by the main bearings 1 and 2. In order that the pistons 36 and shaft 32 may freely oscillate on shaft 41, there are provided precision bearing 42 and needle bearing 43. For the purpose of interlocking hub 12 of cylinder 4 to shaft 41, hollow shaft 32 is cut away except for two forwardly projecting segments shown at 33' (Figures 5 and 6), the purpose of which will be explained later when the means of supplying cooling water to the rotor and pistons is described. A cut-away flange 44 (Figures 2 and 5) is keyed to shaft 41 by keys 45 and splined to hub 12 by splined sections 46. The flange 44 is cut away sufficiently so that segments 33' can freely oscillate as the pistons oscillate between their adjacent abutments. Thus the revolving cylinder 4, hub 12 and shaft 41 are caused to rotate as a unit, while the pistons 36 and hollow shaft 32 are free to oscillate relative thereto supported by bearings 30 and 42 on the forward end and 31 and 43 on the rearward end. The shaft 41 is preferably connected to the load at the rearward end after passing through bearing 2.

Forward of bearing 2 and keyed to shaft 41 is an aluminum spider 50 (Figure 3) having needle bearings 51 alined with needle bearings 52 in spider 20. (Figures 3 and 4). Mounted in these alined bearings 51 and 52 are crank shafts 53. It is preferred to have four of these crank shafts so as to better distribute them around the circumference, thereby decreasing the weight and inertia of each of the reciprocating parts. On the rear ends of the crank shafts, and keyed thereto, are gears 54 meshing with non-rotatable gear 3 on bearing 2. Gears 54 are one half the diameter of fixed gear 3 so that as the cylinder 4 revolves along with hub 18 and shaft 41 carrying the spiders 20 and 50, the crank shafts 53 will be revolved at twice the R. P. M. of the cylinder 4 and shaft 41.

Splined on the rearward end of hollow shaft 32 at 55' is a bearing ring 55 (Figures 3 and 4) having four needle bearings 56 to support the journals 57' of connecting rods 57, the outer ends being drilled and mounted on the cranks 59 by needle bearings 58. In order to assemble this needle bearing, the forward end of the crank is reduced in diameter as at 60 and keyed in a hole in the crank web 61 as shown in Figure 4. If desired the cranks 59 could be integral with crank web 61 and keyed into the rearward crank web 61' instead of fixed thereto. The cranks are counterbalanced by the counter weights 60'. The throw of the cranks 59 is sufficient to move or oscillate bearing ring 55 and thus hollow shaft 32, to which it is splined, and pistons 36 through the desired angle as determined by the necessary clearances between the pistons and the walls 26 and 27 of the abutments 25, which clearances will be referred to later.

In order to maintain rigid alinement of bearings 51 and 52 against any torsional variation in shaft 41, spiders 20 and 50 are surrounded by rings 62 (Figure 4) which are splined to the spider as shown at 62' at the top of each of the four projections and, allowing sufficient room for crank rotation, four circular plates or grid members 63 are fastened to the two rings 62, thus making a rigid cage for maintaining alinement of the crank shaft bearings 51 and 52.

Since the above structure gives two complete oscillation cycles between the pistons 36 and abutments 25 for each revolution of the cylinder 4, all cycles of the four cycle engine can be accomplished in each cylinder revolution. Referring to Figure 1 if the working volume C—1 is assumed to be in full compressed position, volume C—2 will be in fully expanded position, volume C—3 in fully exhausted position and volume C—4 will be in the full intake position for clockwise rotation. However as each of the four volumes comes up to full compression, it is fired, and reference to Figures 7a–d will show the relative location of the abutments and pistons at the four firing points, where A and B are the abutments and C and D are the pistons.

Using the letters in clockwise direction, if 7a is taken as the firing point for the compartment between C and A, hereinafter referred to as C—A, the location of the spark is indicated by the arrow, disregarding the spark advance which will be discussed later, and the corresponding combustion chamber is shown dotted.

Figure 7b shows the full expansion of volume C—A and the exhaust cycle begins.

Figure 7c shows position where the exhaust cycle ends and intake begins for space C—A.

Figure 7d shows the end of the intake cycle for C—A and beginning of the compression cycle which terminates as shown in Figure 7a.

The intake and exhaust means to be described later in detail consists of valves opened radially by a circular cam, there being one port and one valve for each volume serving as an inlet and exhaust port and located in the cylinder in the combustion chamber as shown in Figures 1 and 9. Thus the valve for C—A should open for exhaust when abutment A reaches the position shown in Figure 7b and continue open for exhaust until abutment A reaches the position shown in Figure 7c. By a manifold construction explained later it is not necessary to close the valve on completion of the exhaust cycle and the beginning of the intake, so that the valve continues to remain open for intake until abutment A reaches the position shown in Figure 7d, where it closes. This fixed arc of rotation, where the valve is continuously open for exhaust and intake is shown as a dotted arc in Figure 8 and constitutes 180°.

An inspection beginning with Figure 7c where volume D—B fires will show that the beginning of the exhaust and the end of the intake cycles of this volume will occur at the same locations so that the valve for this volume is open throughout the same fixed arc of rotation.

For volume A—D the firing point is as shown in Figure 7d. Figure 7a shows the beginning of the exhaust cycle and Figure 7c shows the end of the intake cycle and the solid arc on Figure 8 shows the fixed arc of rotation where the valve for this volume will be open.

Beginning with Figure 7c it will be seen that the exhaust and intake cycle of volume B—C will occur during the same fixed arc of rotation so that all four valves can be operated by two fixed circular cams offset longitudinally and circumferentially.

It should be noted that not only is the location of the spark plug for the two groups A—D; B—C and C—A; D—B at different locations circumferentially at the firing point but also the volumes themselves are at different locations.

With the intake and exhaust each taking place in one quarter of a revolution the question of volumetric efficiency becomes of paramount importance and rapid opening and closing of the valves highly important.

Poppet valves 70 (Figures 1 and 9) are located radially in each of the four combustion chambers 28 and 29 arranged in offset pairs for the reason outlined. The valve 70 is first inserted and the valve seat 71 is firmly set against the shoulder shown by the locking member 72. The valve guide 73 is supported by an aluminum split ring 74 and 74' fastened together by countersunk bolts, not shown, and fastened to cylinder 4 by pins not shown. The valve guide is prevented from having radial motion by pin 73'.

On the top of the valve stem is pinned a slipper 75 by pin 75' and the valve urged in an axial direction by helical spring 77 so that the slipper 75 bears against a fixed circular steel cam 76. Since the valve is urged to closed position by centrifugal force, spring 77 does not have to be a strong spring like now necessary. As previously stated there are two of these cams and the depressed portions, where the valves are held open, are shown for the two pairs of valves by the dotted and solid arcs in Figure 8.

The cam is bolted between the two walls of a split manifold casting 78 and 79 by bolts 80. The casting and cam are held in a centered position and against rotation so that the cylinder and split ring 74—74' turns freely therein. Figure 9 shows the valve in a position where it has just entered the exhaust manifold area. Previous to entering the manifold the walls of the split manifold casting 78 and 79 are collapsed and continue down to the cylinder as shown at 83 and 84. The bulged or exhaust manifold conduit sections 81 and 89 continues around the arc of the exhaust cycle where it is collapsed as at 83—84 for separating the exhaust manifold from the intake manifold. It is then expanded again to the 81—89 form for the arc of the intake cycle and then collapsed again for the arc of the compression and power cycles, when it again expands to the showing in Figure 9. The carburetor and exhaust pipes are connected to flanges 82 on the respective manifold sections.

Due to the large diameter of cam 76 the cam portion 85 for opening only occupies a relatively small arc, about 10°, so that the valve is wide open substantially the entire period of exhaust and intake. The circumferential force of slipper 75 acting on cam 85 is absorbed by slide block 85' bolted to ring 74 and bearing against the rear of slipper 75. In order to insure quick closing the lower portion of slipper 75 can be urged outward by cam sections 86 located at the arc of closing. To allow for wear on the valve seats the slipper should ride clear of cam 76 when the valve is closed. If desired the opening of the exhaust and closing of the intake can be given the customary lead and lag but since this cycle is one-quarter revolution instead of one-half, the degrees measured circumferentially should be one-half as many.

In order to insure free passage of the gases to the valve, the split ring 74 is cut away as at 87, Figures 1 and 9, allowing free passage to manifold section 89. This also facilitates the rapid closing and opening of exhaust and intake passage in passing through the collapsed section dividing the two manifolds. This collapsed section should be substantially as wide as the walls 88, 88' (Figure 1) so that as one side closes, the other starts to open and rapidly provides a free flow of gas to the valve.

To insure proper combustion the combustion chambers 28 and 29 must be of correct design. The engine shown is for a six inch working cylinder. The clearance at each end of the stroke is one-tenth inch. Thus using an appropriate high compression ratio, about eighty percent of the volume of the compressed fuel mixture is located in the combustion chamber. The two sets of combustion chambers are located near opposite ends of the cylinder, as shown in Figure 9 where X—X is the center line of the cylinder.

The spark gap 90 is located in the combustion chamber offset from the valve towards the center line. Further it should be offset circumferentially toward the rear of the combustion chamber as shown in Figure 1. With this arrangement the mixture, which is rapidly compressed into the compact combustion space, will be in condition for the rapid combustion required at the high explosion rates necessary for high speed operation. Further the explosive wave will enter the small clearance between piston and abutment as a high pressure, high velocity wave necessary to rapidly complete the combustion in this large area which is cooled by the walls of the piston and abutment.

As explained under Figures 7a–d and 8, the firing for the two groups of volumes is at different locations circumferentially and the firing of all the volumes can be arranged by four commutator segments located around the cylinder 4. In Figure 9 one of the commutator segments is shown at 103. This is mounted in a hardened plastic insulation 92 located in a circular metal channel 93, which is turned inward at 94 to retain the commutator segments against centrifugal force.

Surrounding the commutator is a stationary insulated shield 95 which is protected by a metal shield 97. This shield is drilled as shown at 98 and a sparking terminal 99 is inserted to leave a small gap between it and the commutator for the spark to jump. This is preferable to a brush on account of the high speed of the commutator segments. Sparking terminal 99 is positioned by an insulated sleeve 96 into which projects the insulated conductor 100 from the spark coil, and contact is made between this conductor and the terminal 99 by a small spring as shown. The insulated conductor 100 is enclosed in a metal tubing 101, flexible if desired, which is attached in the customary manner to a threaded projecting nipple 97' on the shield 97. The small flange 101' on tubing 101 serves to position sleeve 96 and thereby contact 99.

The four commutator segments are connected to their respective spark plugs by an insulated wire through conduits 102, indicated dotted, and connected in the customary manner to projecting nipples welded to channel 93 and the projecting nipples 91 on the spark plug shields.

Referring again to Figures 7a–d, it will be seen that if the oscillating means is set so that volume C—A is at the firing point when A is at the top as shown in Figure 7a, then B—C will fire when A is as shown in Figure 7b and D—B when A is as shown in Figure 7c and A—D when A is as shown in Figure 7d. The location of the spark plug is indicated by the arrow in each case and the combustion chamber fired is shown dotted. Thus one volume is fired every one-quarter turn of abutment A.

A single sparking terminal can be used if it is located as shown by the arrow 99 in Figures 7a–d. The location of the commutator strip for combustion chamber 29 of abutment A is indicated by the arc 103 in Figure 7a. The arc for 28B is 104 in 7b; for 29B is 105 in 7c and for 28A is 106 in 7d. In Figure 7d the arc of commutator strips 103, 104 and 105 are shown dotted to show the location of the entire assembly. Each commutator segment is made sufficiently long so as to permit firing a few degrees past dead center as determined by the oscillating cranks and to allow for a substantial spark advance. If a range is allowed of 10° after dead center of the cranks to 50° before dead center, this will correspond to 5° and 25° around the circumference of the cylinder or a thirty degree arc for each commutator segment.

Referring to Figures 7a–d, it will be seen that if the firing is substantially before dead center of the oscillating cranks, the pressure of the burning mixture is always in a direction to assist the cranks in overcoming the inertia of changing the direction of the oscillating pistons and thus always greatly diminish the peak load on the connecting rods and crank-shaft bearings. To accomplish this for the best results, it is not only desirable to advance the spark from not earlier than dead center for starting to spark advances according to speed as the engine accelerates, but also to modify the advance according to load so that the advance is greater at low load than it is when the engine is heavily loaded and the explosion pressures are high.

Referring to Figure 11, shaft 110 is geared by worm gearing (not shown) to shaft 41 as in present standard practice, so as to rotate at half engine speed. Upon this shaft in housing 111 is the lower part 112 of the governor member in which is cut one face of the cam 113, the other face 114 being cut in the upper governor member 124 which is rotatively mounted on a reduced portion of shaft 110 shown at 115. Between the two cam faces are located centrifugal balls 116 which operate against springs 117 to advance the breaker cam 118 operating breaker 119 (Figure 10) located on base plate 125 which is free to rotate in housing 111 through a limited angle on ball races 120. This rotation is controlled by the intake manifold vacuum connected to inlet 121 operating on diaphragm 122 against spring 126 to retract lever 123 and rotate breaker base 125 in a direction to advance the spark at high vacuum or reduced throttle openings. However at very low and idling speed it is not desirable to have the vacuum advance the spark. This can be prevented by locating a solenoid operated needle valve 108 in the vacuum connection, and arranging it to open the valve by the charging current in solenoid 107 when the cut-out relay on the standard generator, battery charging system closes as the generator attains sufficient speed to generate a voltage to charge the battery. Thus by the insertion of a small bleed 127 in the vacuum chamber, the action of vacuum to advance the spark is cut out by spring 109 closing the valve 108 when the cut-out opens the circuit through solenoid 107. If a magneto ignition is used the valve 108 could be operated by a small mechanical governor.

The battery, breaker 119, spark coil and condenser are connected up as in common practice as well as the charging generator and cut-out except, as stated above, the charging current passes through the solenoid 107 to operate the vacuum valve 108. Conductor 100 of the sparking terminal 99 is connected directly to one terminal of the spark coil and the other terminal is grounded in the usual manner, the commutator serving as a distributor.

Although not necessary for the rotary engine, a distributor head 131 is shown in Figure 11 which would be desirable if the engine was converted to an oscillating engine by fixing the cylinder 4 and driving gear 3 by the crankshafts 53 to transmit the engine power.

The upper governor member and breaker cam is positioned on extension 115 of shaft 110 by a round nut 128 over which fits the insulated member 129 of the distributor, seating on the square section 130 above the breaker cam. The distributor head 131 is the same as in common use and can be either of the brush type or of the gap type as shown. The seal for the pistons is made by means of narrow flat cast iron strips 135 laid in grooves along the tops of the pistons (Figure 1). The strips do not extend to the bottom of the grooves so that each may be spring pressed by a snake spring 136 against the cylinder liner 5. The ends of the pistons are equipped with similar spring pressed strips 135'. The inner faces of the abutments are equipped with similar spring pressed strips 137 which bear against liner 34 on the oscillating hollow shaft 32. The junction between liner 34 and the liners 9 and 15 on the cylinder end flanges 8 and 14 (Figures 2 and 3) is sealed by means of spring rings 138 similar to piston rings except that the pressure is inward against the liner 34. The joints in these rings are located at the center of one of the abutments and they are pinned against rotation with liners 9 and 15 at the center of the other abutment. These pins, not shown, are in radial notches in the top of rings 138 and are preferably fixed in the ends of the abutments. This means of locating allows the rings to contract on wear. The rings press against flanges 139 on flange liners 9 and 15. These flanges have radial lengths less than that of rings 138 so that the gas pressure in the cylinder will exert a hydrostatic pressure on the oil film between parts 138 and 139 much greater than the gas pressure itself, thus preventing leakage. Within the circumference covered by the oscillating pistons, but not behind the abutments, either the ring or the flange may be beveled slightly as at 140 so that the gas pressure will aid the ring spring pressure in sealing the joint between the rings and liner 34.

In a high speed engine it is not only necessary to supply oil to the moving parts, but it is necessary that this oil have a free flow, so that the heated oil will pass on to cool and prevent the detrimental cracking and gumming that would occur if maintained for long periods at high temperatures.

To oil the piston, shaft 41 is drilled centrally at 150 (Figures 1 and 2) and plugged at 151. In the main bearing 1 there is an oil manifold M connected by a radial drill hole 152 in shaft 41 with drill hole 150. A second radial drill hole 153 connects 150 with a circular groove 154 cut around the inside of hollow shaft 32. A radial drill hole 155 registers with a corresponding hole 155' in a solid part of the piston which meets a horizontal drill hole 156' which, at the forward end of the piston opens into a groove 156 centrally located along the forward end of each piston (Figure 1). There will be a leakage along shaft 41 from groove 154 to bearing 42 to oil this bearing, the excess escaping into the pocket formed by cutting away shaft 32 as explained for Figure 5. The drill holes are not lined up with the plane of Figure 2, but are projected around to show their true proportions, but the location circumferentially is shown in the cross section Figure 1. Each groove 156 is carried across the top of the piston as shown at 157 and down a groove corresponding to groove 156 on the rearward face of the piston.

Toward the center of the pistons behind the sealing strips 135' are cut grooves 158 down the faces of the piston and connected by a groove 159 across the top of the piston. The rearward grooves 158 are connected to the rearward groove 156 by circumferential grooves 160. Thus as oil is wiped off the cylinder liner 5 and flange liners 9 and 15 by the sealing strips next to grooves 158 and 159 more oil than is necessary is prevented from remaining on the liner walls and exposed to combustion temperatures. The escape of the oil from the rearward groove 156 is by radial drill hole 161 (Figure 3) which corresponds to drill hole 155 at the forward end, and drill holes corresponding to holes 155' and 156' are in the location shown by dotted lines 178 and 179, to be referred to later. Radial drill hole 161 connects with longitudinal drill hole 162 and is exhausted upward behind bearing 55 as shown. There will be a corresponding system on the other piston.

In the same way that leakage along the shaft from groove 154 supplies bearing 42, the leakage in the opposite direction will supply bearing 43 as the fit between the two shafts is not tight.

From groove 154 there is also a fine drill hole 163 to the circular pocket behind ring 138. This will supply the lubricant for the ring 138 and bearing 30, the excess escaping into the pocket shown in Figure 5 as explained for bearing 42. Since both bearings 30 and 42 are precision bearings, the escape of oil through them can be controlled by the size of the oil grooves in the bearing faces.

The oil manifold M in bearing 1 can be sealed by packing glands 164. Leakage from M will supply oil to bearing 1 and the excess carried off by a drill hole 165 and emptied into the pocket shown in Figure 5.

Oil for the inner face of the abutments is supplied by the manifold 19 (Figure 3) through drill hole 170 and inclined drill holes 171 and 172 to longitudinal drill hole 173 extending the length of the abutment (Figures 1, 2, 3). The forward end of drill hole 173 is sealed and a radial drill hole 174 near the forward end connects hole 173 to groove 175 (Figure 1) extending along the inner face of the abutment. Close to the rearward end of groove 175 there is a circumferential groove 176 connecting groove 175 with longitudinal grooves 177 corresponding to grooves 159 on the pistons. At the junction of cross groove 176 and grooves 177 there are radial drill holes 178 (Figures 1 and 3) connecting with longitudinal drill holes 179 which register with outlet drill holes 180 (Figure 3) which exhaust into the crank case through drill hole 180'. There is a duplicate system for each abutment.

From inlet drill hole 170 there is a small drill hole 181 supplying oil to the circumferential space behind sealing ring 138 and to bearing 31 by leakage along the shaft.

In order to exhaust the pocket shown in Figure 5 there is a drill hole 182 (Figure 2) which is connected as indicated at 182' to the forward end of drill hole 173 in the abutment. Since the exhaust 180' to the abutment oiling system is farther from the center than the exit from the pocket, this pocket will be drained by centrifugal force.

It will be noted that the exhaust from both the oiling system of the pistons and of the abutments is farther from the center than the inlet so that centrifugal force assists the oil pump in producing free oil circulation.

It will be noted from Figures 1 and 9 that the cam 76, side walls 78 and 79 and ring 74, 74', form an enclosed circular cavity in which slipper 75 revolves and can be supplied by oil with an inlet connection at the top and drain at the bottom. The centrifugal action of revolving ring 74, 74' will effectively seal the small clearance between the ring and side walls.

Thus it can be seen that all heated parts moving relatively to each other and the bearings are adequately lubricated by a continuous flow of cool oil from the oil pump, not shown, and the hot oil is returned to the crank case for cooling. Since the oil exits 162 and 180' are located radially from the center of shaft 41 this oil will be sprayed into the crank case and serve to lubricate the needle bearings of the oscillating means. However if precision bearings should be desired oil could be carried to bearings 52 by radial drill holes in the spider arms 20 and the crank shafts could be drilled in the usual way.

Bearings 1 and 2 can be mounted on a T-shaped base and the crank case 187 can be of light gauge material. This crank case covers only the oscillating means, the wall on the motor side being shown at 185. The case is in two parts and wall 185 enters a small groove 186 so that any oil running down the wall would be thrown outward by the revolving hub 18 and leakage prevented. The rearward wall 187 can lie in a groove produced by two rings 188 and 189 fixed on shaft 41.

Bearing 2 is shown as a roller bearing and can be oiled by a cup 190 which would be continuously served by oil splash within the crank case.

Cooling water is supplied to the cylinder and abutments by inlet and outlet water manifold 13 having an inlet side 200 and outlet side 201 (Figure 2). Spaced corresponding to the longitudinally extending cooling water jackets 7 of the cylinder 4 are drill holes 202 which are connected by radial drill holes 202' with water inlet manifold 200 (Figures 2 and 5). Drill holes 202 connect at their rearward ends with cooling channels 11 in flange 8 and through ports 203 to channels 7, and the water flows along the cylinder to ports 204 in flange 14 to channels 17. The water then enters the abutments through ports 204' and flows back through the abutments past the combustion chambers to ports 205 (Figure 1) which register with drill holes 206 (Figure 2) which meet horizontal drill holes 207 in hub 12 (Figure 5) which are connected by radial drill holes to water outlet manifold 201.

Water is supplied to the rotor through longitudinal drill holes 210 and 211 in the cut away portion 33' of shaft 32 as shown in Figure 5. Forward of locking member 44 the cut away ends of portion 33' are tightly surrounded by a ring 212 splined to receive the cut away ends of portion 33' as shown in Figure 6. Surrounding shaft 41 is an end flange 213 (Figure 2) which is bolted into the threaded ends of drill holes 210 and 211 by bolts 214, sealing them. It is also bolted to ring 212 by bolts 214'. This flange closes the oil pocket previously referred to which receives the drain of oil from bearings 30, 42 and 1. The oscillating joint between ring 212 and hub 12 is sealed by packing gland 215, and the joint between the shaft 41 and flange 213 may be sealed by packing gland 216.

Surrounding ring 212 is a water manifold having an inlet compartment 216a and an outlet compartment 217. Radial drill holes 216' (Figure 6) connect compartment 216a with drill hole 210 which continues down shaft 32 along side bolts 38 (Figure 1) and meets an inclined radial drill hole not shown just forward of hole 161 (Figure 3) which leads into the hollow piston.

The water flows back through the pistons through ports 218 (Figure 1) in reinforcing partitions 218' for the piston to an exit drill hole 219. The location of this exit is indicated on Figure 2 at 220. This hole is drilled inclined as shown in Figure 1 so as not to interfere with oil drill hole 156'. The drill hole 219 registers with an inclined radial drill hole 219' in shaft 32 which connects with longitudinal drill hole 211 which is in line with bolts 38, but ends before the first bolt. Radial drill holes 217' (Figure 6) registering with outlet manifold 217 connect with drill holes 211 allowing the water to escape into the outlet water manifold compartment 217. Surrounding both water manifolds is a non-rotatable casing 221 to catch any water that escapes through the small clearance between the water manifolds and the rotating surfaces which they surround. Water from the water pump, not shown, is supplied to manifolds 200 and 216a and returns to the radiator, not shown, from manifolds 201 and 217. By providing a Venturi passage in the connection from the radiator to the pump the casing 221 can be drained.

If more cooling of the valve is desired than shown, another water passage 7 can be introduced to partially encircle the valve. However, since the valve acts first as the exhaust and then the intake of fuel mixture containing liquid gasoline spray to be vaporized, the valve is largely self cooling.

The circular stationary cam arrangement outlined above for the valves can also be utilized to operate a pump for liquid fuel injection. Such an application is shown in Figure 13 which illustrates a cylinder 4 and an abutment 25 having the offset combustion chamber 28. Threaded into the cylinder 4 in the roof of the combustion chamber is the injection valve 301. Offset circumferentially is the pump 302 having a plunger 303 tightly fitting in a small bore in casing 304 and integral with a larger cylindrical portion 305 adapted to absorb the thrust. Spring 306 maintains an outward pressure on the plunger to seat it against stop ring 307.

To supply the fuel, hub 18 (Figure 3) is lengthened and an oil feed manifold similar to manifold 19 is mounted thereon, and drill holes through the hub, flange 14 and cylinder 4 terminate in a circular groove 308 as indicated at 309. Communicating with groove 308 is the passage 310 leading to check valve 310' and passage 311 to pump chamber 312.

As cylinder 4 revolves, cammed head 313 of plunger 303 and cylindrical portion 305 comes against a stationary circular cam 314 forcing down plunger 303 and forcing the fuel through passage 315 to circular groove 316, passage 317, circular groove 318, passage 319 raising the valve 320 against the pressure of spring 321 and passes out through the fuel orifices 322 into the combustion chamber 28.

Circular cam 314 is maintained against longitudinal movements by flanged guides 325 in a stationary guide frame, not shown. Radial movement of cam 314 is prevented by wedge member 326 slidably mounted in the stationary guide frame by flanges 327. When not pressed outward by cammed head 313, the circular cam 314 is radially positioned outward against wedge member 314 by springs, not shown. Wedge member 326 may be moved in the stationary guide frame on flanges 327 by the rod 328 which may be controlled in any known way such as a control lever. Thus in Figure 13 if rod 328 is moved toward the right, wedge 326 moves to the right on flanges 327 in the stationary guide frame and the circular cam 314 moves radially outward on the flanged guides 325 in the stationary guide frame and thereby reduces the travel of piston 303 and the amount of fuel injected into combustion chamber 28 through orifices 322 to control the engine. Both spring chambers must be vented as at 329 and 330 to permit the escape of any leakage past the plunger 303 and valve 320.

What I claim is:

1. A rotary high speed internal combustion engine comprising a rotatable power shaft, a rotatable cylinder surrounding said shaft and constrained to rotate on its axis therewith, internal radial abutments carried by and rotatable with said cylinder, a hollow shaft within said cylinder rotatably mounted on said first shaft, pistons carried by said hollow shaft and alternating with said abutments, offset bearings constrained to rotate with said cylinder and shaft, crankshafts mounted in said bearings, offset bearings constrained to rotate with said hollow shaft, connecting rods connecting the cranks of said crankshafts with said last named bearings, means for rotating said crankshafts in said first named bearings during rotation of said cylinder to oscillate said pistons between their cooperating abutments, means for admitting an explosive mixture between adjacent abutments and pistons at one point in a revolution, means for exploding said mixture at another point, and means for exhausting the exploded gases at still another point, to cause said cylinder to rotate and drive said power shaft.

2. A rotary high speed internal combustion engine comprising a rotatable closed cylinder having a plurality of internal radial abutments fixed thereto and rotating therewith, said abutments having at each side thereof combustion chambers, an independent rotor within said cylinder, and a plurality of cooperating pistons thereon, drive means between said cylinder and rotor for rotating the latter at a constantly varying speed relatively to the former in a rotary-oscillatory movement of said rotor, means for admitting an explosive mixture in said spaces between each abutment and the two adjacent pistons during a part of a revolution, means for igniting said mixture at another point in said revolution, and means for exhausting the burned gases during a subsequent part of said revolution, said means for admitting and exhausting said gases comprising a single intake and exhaust port in the closed cylinder between each piston and the adjacent abutment, a poppet valve in said port, and means for retaining said valve open during the period of admission and retaining said valve open during the period of exhaust.

3. A high speed four cycle internal combustion engine comprising a cylinder having a plurality of internal radial abutments fixed thereto and rotating therewith, an independent rotor within said cylinder and a plurality of cooperating pistons thereon alternating with said abutments forming combustion spaces at each side of each abutment, means to restrain said pistons to oscillate between their cooperating abutments to produce the operating cycles of said engine, means for admitting an explosive mixture to each of said combustion spaces, means for igniting said mixture and means for exhausting the burned gases, said pistons being so shaped and said oscillating means being so proportioned that said pistons approach said abutments within only a small clearance, each abutment having an offset combustion chamber in each side thereof, one for each adjacent combustion space, and so proportioned with said combustion space that when the piston approaches an abutment on the compression stroke, a desired high compression ratio is obtained with a substantial part of the compressed gases located in said combustion chamber.

4. A rotary high speed four cycle internal combustion engine comprising a rotatable cylinder having a plurality of internal radial abutments rotating therewith, an independent rotor within said cylinder, a plurality of cooperating pistons thereon alternating with said abutments and forming combustion spaces at each side of each abutment, drive means between said cylinder and rotor for rotating the latter at a constantly varying speed relatively to the former in a rotary-oscillatory movement of said rotor, means for admitting an explosive mixture to each of said combustion spaces at one point in a revolution, means for igniting said mixture at another point and means for exhausting the burned gases at still another point in said revolution, said pistons being so shaped and said oscillating means being so proportioned that said pistons approach said abutments within only a small clearance, each abutment having an offset combustion chamber in each side thereof, one for each adjacent combustion, and so proportioned with said combustion space that when the piston approaches an abutment on the compression stroke, a desired high compression ratio is obtained with a substantial part of the compressed gases located in said combustion chamber.

5. The combination of claim 4 further characterized by means to circulate a cooling fluid around said combustion chambers for cooling purposes.

6. The combination of claim 4 further characterized in that the means admitting said explosive mixture and the means for exhausting said burned gases includes a single intake and exhaust port located in each combustion chamber, means for opening said port during the period of admission and for opening said port during the period of exhaust, and a spark plug located adjacent to said port in the combustion chamber.

7. A high speed internal combustion engine comprising a cylinder having a plurality of internal radial abutments, an independent rotor within said cylinder, a plurality of cooperating pistons thereon alternating with said abutments and forming combustion spaces at each side of each abutment, drive means between said cylinder and said rotor for rotating the latter at a constantly varying speed relative to the former in a rotary-oscillatory movement of said rotor, means for admitting an explosive mixture to each of said combustion spaces, means for igniting said mixture, and means for exhausting the burned gases, said pistons being so shaped and said oscillating means being so proportioned that said pistons approach said abutments within only a small clearance, offset combustion chambers, one for each combustion space and so proportioned with said combustion space that when the piston approaches an abutment on the compression stroke, a desired high compression ratio is obtained, an intake port in each of said combustion chambers, said port and said combustion chamber forming the intake passage to said combustion space, said port having a passage area less than said combustion chamber passage, and said intake port having a passage area corresponding in size to a substantial portion of the cross sectional area of its respective combustion space when oscillated to its maximum volume, thereby permitting the free flow of the explosive mixture necessary for high operating speeds.

8. A high speed internal combustion engine comprising a cylinder having a plurality of internal radial abutments, an independent rotor within said cylinder having an arc thereof surrounded by said abutments, a plurality of cooperating pistons on said rotor having an arc thereof surrounded by said cylinder, end closures for said cylinder cooperating with said abutments and said pistons, means to restrain said pistons to oscillate between their cooperating abutments to produce the operating cycles of said engine, gas pressure sealing means between said pistons and said cylinder, between said pistons and said end closures, between said abutments and said rotor and between said end closures and said rotor, and means to provide a flow of lubricating fluid to said surrounded surfaces and to all said sealing means.

9. A high speed four cycle internal combustion engine comprising a cylinder having a plurality of internal radial abutments, an independent rotor within said cylinder and a plurality of cooperating pistons thereon, constituting a piston unit, and alternating with said abutments to form a combustion space between each of said abutments and each adjacent piston, means to restrain said pistons to oscillate between their cooperating abutments to produce the operating cycles of the engine, means for admitting an explosive mixture to each of said combustion spaces on alternating sides of said piston unit, a spark plug for each combustion space, a timing means driven by said engine, means for successively connecting each spark plug to said timing means, so as to produce a spark on alternating sides of said piston unit, means for exhausting the burned gases, whereby one power cycle is continuously acting on said piston unit and assisting said oscillating means, and means in said timing means for automatically advancing said spark according to increase in speed of said engine to further assist said oscillating means.

10. A rotary high speed four cycle internal combustion engine comprising a rotatable cylinder having a plurality of internal axial abutments rotating therewith, an independent rotor within said cylinder, a plurality of cooperating pistons thereon constituting a piston unit and alternating with said abutments to form a combustion space between each of said abutments and each adjacent piston, said cylinder and rotor rotating constantly during the operation of said engine, means to restrain said pistons to oscillate between their cooperating abutments to produce the operating cycles of said engine, means for successively admitting an explosive mixture to each of said combustion spaces during a revolution of said cylinder, a spark plug for each combustion space, a timing means driven by said engine, means for successively connecting said spark plugs to said timing means, means for successively producing a spark and igniting said mixtures during said revolution, means for successively exhausting the burned gases during said revolution, whereby one power cycle is continuously acting on said piston unit and assisting said oscillating means, and means in said timing means for automatically advancing said spark according to increase in speed of said engine to further assist said oscillating means.

11. The combination of claim 10 further characterized by means to further advance said spark as the throttle is released from full load position and thereby increase the vacuum in the intake manifold.

12. A rotary high speed internal combustion engine comprising a rotatable cylinder having a plurality of internal radial abutments rotating therewith, an independent rotor within said cylinder, a plurality of cooperating pistons thereon and alternating with said abutments to form a combustion space between each abutment and the adjacent pistons, said cylinder and rotor rotating constantly during the operation of said engine, means to restrain said pistons to oscillate between their cooperating abutments to produce the operating cycles of said engine, means for admitting an explosive mixture to each of said combustion spaces, means for igniting said mixture, means for exhausting the burned gases, said means to ignite said mixture comprising a spark plug for each combustion space, commutator segments connected with said spark plugs and rotating with said cylinder, a stationary contact member contacting said commutator segments, and a timing means driven by said engine for timing said ignition, said commutator segments each covering a sufficient arc to permit advance and retardation of said spark.

13. The combination of claim 12 further characterized by means to advance said spark according to the speed of said engine with said commutator acting as a distributor.

14. A rotary high speed internal combustion engine comprising a rotatable cylinder having a plurality of internal axial abutments rotating therewith, an independent rotor within said cylinder, a plurality of cooperating pistons thereon and alternating with said abutments, said cylinder and rotor rotating constantly during the operation of said engine, means to restrain said pistons to oscillate between their cooperating abutments, means to admit an explosive mixture to each of said combustion spaces, means for igniting said mixture and means for exhausting the burned gases, means to provide a flow of cooling fluid to cool the heated areas of said cylinder and abutments and of said pistons, said means for supplying the cooling fluid including an intake and outlet manifold for said cylinder and abutments and an intake and outlet manifold for said pistons, and means to supply a flow of oil including an oil intake manifold, said cooling fluid manifolds being located on one side of the engine and said oil manifold being located on the other side of the engine.

15. A rotary high speed internal combustion engine comprising a rotatable cylinder having a plurality of internal axial abutments rotating therewith, an independent rotor within said cylinder, a plurality of cooperating pistons thereon and alternating with said abutments to form a plurality of combustion spaces between said abutments and said pistons, means rotating said cylinder and rotor constantly during the operation of said engine, means to restrain said pistons to oscillate between their cooperating abutments to produce the operating cycles of said engine, to produce the operating cycles of said engine, means for controlling the intake and exhaust of said engine, means to inject a liquid fuel into said combustion spaces.

16. A high speed four cycle internal combustion engine comprising a cylinder having a plurality of internal radial abutments, an independent rotor within said cylinder and a plurality of cooperating pistons thereon alternating with said abutments forming combustion spaces at each side of said abutment, means to restrain said pistons to oscillate between their cooperating abutments to produce the operating cycles of said engine, each combustion space being provided with a port, a poppet valve in said port, an intake manifold, an exhaust manifold, said port registering alternately with said exhaust manifold and said intake manifold for exhaust out of and intake into said combustion space, means to retain said valve open during the exhaust stroke when said port is registered with said exhaust manifold, means to subsequently retain said valve open during the intake stroke when said port is registered with said intake manifold, whereby said intake acts to cool said valve following said exhaust stroke.

17. The combination of claim 16 further characterized where the opening means for said valve is a cam, shaped to hold said valve continuously open during the exhaust and subsequent intake strokes.

FRANK H. BEALL.

REFERENCES CITED

The following references are of record in the file of this patent:

UNITED STATES PATENTS

| Number | Name | Date |
|---|---|---|
| 977,260 | Beck | Nov. 29, 1910 |
| 878,364 | Edwards | Feb. 4, 1908 |
| 1,294,487 | Laberge | Feb. 18, 1919 |
| 1,917,180 | Zwick | July 4, 1933 |
| 1,536,245 | Thelin | May 5, 1925 |

FOREIGN PATENTS

| Number | Country | Date |
|---|---|---|
| 174,901 | England | 1923 |
| 614,970 | France | 1926 |